(12) United States Patent
Nagai et al.

(10) Patent No.: US 10,490,800 B2
(45) Date of Patent: Nov. 26, 2019

(54) BATTERY PACK

(71) Applicant: TOYOTA JIDOSHA KABUSHIKI KAISHA, Toyota-shi, Aichi-ken (JP)

(72) Inventors: Hiroki Nagai, Ama-gun (JP); Koji Tamaru, Toyota (JP); Ryo Kagami, Ichinomiya (JP); Yuki Okamoto, Chiryu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 29 days.

(21) Appl. No.: 15/924,493

(22) Filed: Mar. 19, 2018

(65) Prior Publication Data
US 2018/0277818 A1 Sep. 27, 2018

(30) Foreign Application Priority Data

Mar. 24, 2017 (JP) .................................. 2017-060151

(51) Int. Cl.
*H01M 2/20* (2006.01)

(52) U.S. Cl.
CPC ............ *H01M 2/206* (2013.01); *H01M 2/202* (2013.01); *H01M 2220/20* (2013.01)

(58) Field of Classification Search
CPC ........ H01M 2/20; H01M 2/202; H01M 2/204; H01M 2/206
See application file for complete search history.

(56) References Cited

U.S. PATENT DOCUMENTS

| | | | | |
|---|---|---|---|---|
| 2006/0270286 A1* | 11/2006 | Zhao | .................... | H01M 2/206 439/840 |
| 2011/0101920 A1* | 5/2011 | Seo | .................... | H01M 2/1077 320/127 |
| 2012/0100761 A1* | 4/2012 | Gro e | .................... | H01M 2/202 439/774 |
| 2014/0356691 A1 | 12/2014 | Ahn | | |
| 2015/0140393 A1* | 5/2015 | Yamamoto | .......... | H01M 2/1077 429/121 |
| 2017/0244091 A1* | 8/2017 | Yuasa | .................... | H01M 2/202 |
| 2018/0277807 A1* | 9/2018 | Lorentz | ................ | H01M 2/1077 |
| 2018/0294465 A1* | 10/2018 | Nagai | ................... | H01M 2/206 |

FOREIGN PATENT DOCUMENTS

| | | |
|---|---|---|
| JP | 2010-212155 A | 9/2010 |
| JP | 2013-191337 A | 9/2013 |
| KR | 10-2014-0140744 A | 12/2014 |

* cited by examiner

*Primary Examiner* — Scott J. Chmielecki
(74) *Attorney, Agent, or Firm* — Sughrue Mion, PLLC

(57) ABSTRACT

The present invention provides a battery pack that has a plurality of single cells arranged in an array direction, and a bus bar that electrically connects the plurality of single cells. The bus bar has a first bent portion that is bent in a direction away from each of the single cells, and a second bent portion that is bent in a direction opposite to the direction in which the first bent portion is bent. The first bent portion and the second bent portion are disposed side by side in the array direction, and extend from one end of the bus bar to the other end of the same so as to intersect with the array direction. The first bent portion is configured to expand gradually from the one end of the bus bar to the other end of the same. The second bent portion is configured to narrow gradually from the one end of the bus bar to the other end of the same.

3 Claims, 6 Drawing Sheets

BATTERY PACK

CROSS REFERENCE TO RELATED APPLICATIONS

The present application claims priority based on Japanese Patent Application No. 2017-060151, filed on Mar. 24, 2017, the entire contents of which are hereby incorporated by reference.

BACKGROUND OF THE INVENTION

1. Field of the Invention

The present invention relates to a battery pack. More specifically, the present invention relates to a battery pack having a plurality of single cells.

2. Description of the Related Art

Battery packs having a plurality of single cells electrically connected have been widely used as high-output power sources for driving vehicles. For example, Japanese Patent Application Laid-open No. 2013-191337 and Japanese Patent Application Laid-open No. 2010-212155 each disclose a battery pack in which external terminals of a plurality of single cells are connected in series by bus bars. FIG. 1 of Japanese Patent Application Laid-open No. 2013-19133 disclose a bus bar having a pair of electrode connecting portions and a coupling portion interposed between the electrode connecting portions and having a U-shaped bent portion. According to Japanese Patent Application Laid-open No. 2013-19133, positional shift between the single cells can be absorbed by connecting the external terminals of the single cells using such bus bar.

SUMMARY OF THE INVENTION

However, the inventors of the present invention have newly found out that the battery pack with such a configuration described in Japanese Patent Application Laid-open No. 2013-19133 is susceptible to displacement in a rotational direction. Specifically, when the battery pack is installed in a moving object such as a motor vehicle, the battery pack is exposed to stress such as vibration and shock. In the battery pack disclosed in Japanese Patent Application Laid-open No. 2013-19133, however, in a case where stress in "torsional direction" is added to the battery pack due to vibration, shock or the like, the stress concentrates on the parts where the external terminals and the bus bar are connected. As a result, the external terminals are released from the bus bar, possibly electrically disconnecting the single cells.

The present invention was contrived in view of the foregoing circumstances, and an object thereof is to provide a battery pack in which the electrical connection between an external terminal and a bus bar cannot be cut easily even when the battery pack is subjected to torsional stress.

The present invention provides a battery pack that has a plurality of single cells arranged in an array direction, and a bus bar that electrically connects the plurality of single cells. The bus bar has a first bent portion that is bent in a direction away from each of the single cells, and a second bent portion that is bent in a direction opposite to the direction in which the first bent portion is bent. The first bent portion and the second bent portion are disposed side by side in the array direction. The first bent portion and the second bent portion each extend from one end of the bus bar to the other end of the same so as to intersect with the array direction. The first bent portion is configured to expand in a width thereof gradually from the one end of the bus bar to the other end of the same. The second bent portion is configured to narrow in a width thereof gradually from the one end of the bus bar to the other end of the same.

The bus bar of the battery pack has two bent portions. The wider one of the two bent portions becomes distorted, with the narrow bent portion as a support, when the battery pack is subjected to stress applied in a torsional direction. As a result, the stress that is applied to the battery pack in the torsional direction can be dispersed. Consequently, a concentration of the stress on connections between the external terminals and the bus bar can be reduced. Moreover, with the first bent portion and the second bent portion that are bent into opposite shapes, the battery pack can favorably react to a displacement in a first torsional direction and a displacement in a second torsional direction which is opposite to the first torsional direction. Therefore, electrical disconnection between the external terminals and the bus bar can be prevented, improving durability and reliability of the battery pack.

According to one favorable aspect of the present invention, the first bent portion and the second bent portion are disposed to be at least either point-symmetric with respect to a center of the bus bar or line-symmetric with respect to a centerline of the bus bar in the array direction. Such a configuration can reduce stress applied in the first torsional direction and stress applied in the second torsional direction opposite to the first torsional direction, in a balanced manner.

According to one favorable aspect of the present invention, the single cells each have a power generation element, a battery case for storing the power generation element, and an external terminal attached to the outside of the battery case. The bus bar is electrically connected to the external terminal. A welding joint is formed at a position where the external terminal is connected to the bus bar. In a case where the external terminal and the bus bar are welded to each other and the welding joint fractures, it is difficult to repair the fractured welding joint. Thus, in a case where the external terminal and the bus bar are welded to each other, the advantage of applying the present invention can be exhibited better.

DETAILED DESCRIPTION OF THE PREFERRED EMBODIMENTS

An embodiment of the battery pack disclosed herein is now described below with proper reference to the drawings. Needless to say, the embodiment described here is not particularly intended to limit the present invention. The present invention can be implemented based on the details disclosed in the present specification and the common general knowledge related to the field.

Figure 1:
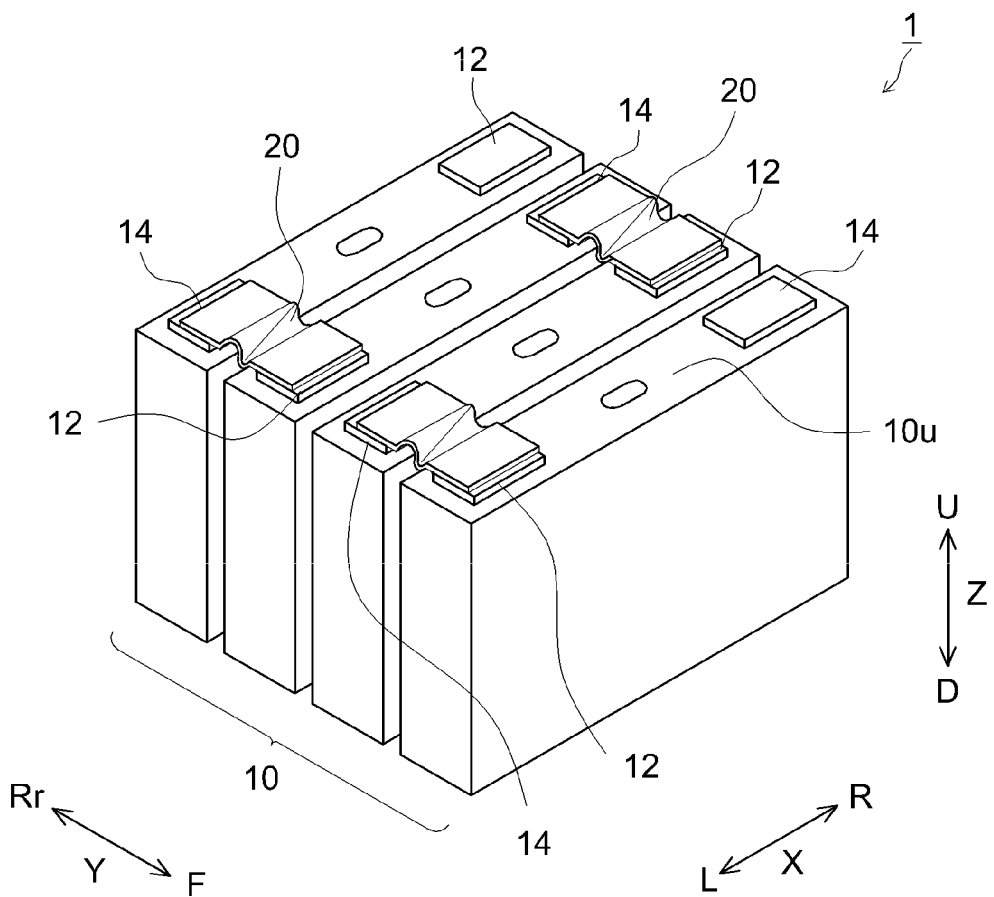
FIG. 1 is a perspective view that schematically shows a battery pack according to an embodiment.

FIG. 1 is a perspective view that schematically shows a battery pack 1 according to the present embodiment. The battery pack 1 has four single cells 10 and three bus bars 20 that electrically connect these single cells 10 to each other. In the following diagrams, the alphabets U, D, F, Rr, L and R represent top, bottom, front, rear, left, and right respectively. The alphabet Y means an array direction in which the single cells 10 are arranged, the alphabet X means a drawing direction intersecting with Y and runs along a long side of each single cell 10, and the alphabet Z means a height direction of the single cells 10. However, these directions are merely for the purpose of illustration and not intended to limit installation modes of the battery pack 1.

The plurality of single cells 10 are in the same shape: a flat square. The plurality of single cells 10 are arranged in line along the array direction Y (a front-rear direction of FIG. 1) in such a manner that a pair of flat side surfaces (wide surfaces) of the single cells 10 face each other. The plurality of single cells 10 are held together by restrictive bands which are not shown. The plurality of single cells 10 are electrically connected in series by the plurality of bus bars 20. However, for instance, the shape, size, number of single cells 10 configuring the battery pack 1 and methods for disposing and connecting these single cells 10 are not particularly limited and therefore can be changed accordingly. Also, for example, heat dissipation members for efficiently dissipating heat generated by the single cells 10, spacers as length adjusting means, or the like, can be disposed between the plurality of single cells 10.

Each of the single cells 10 is stored in a battery case in which a power generation element, not shown, functions as a housing. A configuration of each single cell 10 may be the same as those of the prior art and are not particularly limited. The single cells 10 are typically chargeable/dischargeable secondary cells, such as lithium ion secondary cells. The power generation element typically has a positive electrode, a negative electrode, and an electrolyte. The positive electrode and the negative electrode each contain an active material which is capable of reversibly occluding and releasing charge carriers. The electrolyte includes, for example, a nonaqueous solvent and a supporting electrolyte such as lithium salt. The battery case is made of a light metal, such as aluminum.

An upper surface 10u of each single cell 10 has positive and negative electrode terminals 12 and 14 attached thereto. The positive and negative electrode terminals 12 and 14 are disposed at right and left ends of the single cell 10 in the drawing direction X (a lateral direction of FIG. 1). The positive electrode terminal 12 is made of a metal such as aluminum, nickel, or stainless steel. The positive electrode terminal 12 is electrically connected to a positive electrode (not shown) disposed on the inside of the battery case. The negative electrode terminal 14 is made of a metal such as aluminum, copper, nickel, or stainless steel. The negative electrode terminal 14 is electrically connected to a negative electrode (not shown) disposed on the inside of the battery case. The positive electrode terminal 12 and the negative electrode terminal 14 are each an example of the external terminal. The single cell 10 is charged/discharged through the positive electrode terminal 12 and the negative electrode terminal 14.

In the present embodiment, the positive electrode terminal 12 and the negative electrode terminal 14 each have a flat plate-like shape with a rectangular upper end. In other words, the positive electrode terminal 12 and the negative electrode terminal 14 each have a flat surface that is parallel to the upper surface 10u of the single cell 10. Furthermore, in the present embodiment, the positive electrode terminal 12 and the negative electrode terminal 14 are wider in the drawing direction X than in the array direction Y. However, for instance, the shape, size, and arrangement the positive and negative electrode terminals 12 and 14 are not particularly limited and therefore can be changed accordingly. For example, the positive electrode terminal 12 and the negative electrode terminal 14 may each have a screw tightening portion which is in the shape of a bolt.

The positive electrode terminal 12 and the negative electrode terminal 14 of the single cells 10 adjacent to each other in the array direction Y are connected to each other by the bus bar 20. In other words, the positive electrode terminal 12 of a first single cell 10 is communicated to the negative electrode terminal 14 of a second single cell 10 adjacent to the first single cell 10 in the array direction Y via the bus bar 20. In the present embodiment, the bus bar 20 is disposed so as to cover the flat surfaces of the positive electrode terminal 12 and the negative electrode terminal 14. The bus bar 20 is joined to the flat surfaces of the positive electrode terminal 12 and the negative electrode terminal 14 by a conventionally known joining method such as welding. Welding joints, not shown, are formed where the flat surfaces of the positive electrode terminal 12 and the negative electrode terminal 14 are connected to the bus bar 20. Therefore, the bus bar 20 is integrated with the positive electrode terminal 12 and the negative electrode terminal 14.

The plurality of bus bars 20 are conductive coupling members. The plurality of bus bars 20 are each a plate-shaped member with a thickness of approximately 0.1 to 10 mm, e.g., approximately 0.5 to 5 mm. The plurality of bus bars 20 are each made of a metal such as aluminum, copper, nickel, or stainless steel. The number of bus bars used in a battery pack is generally (the number of single cells−1).

Figure 2:
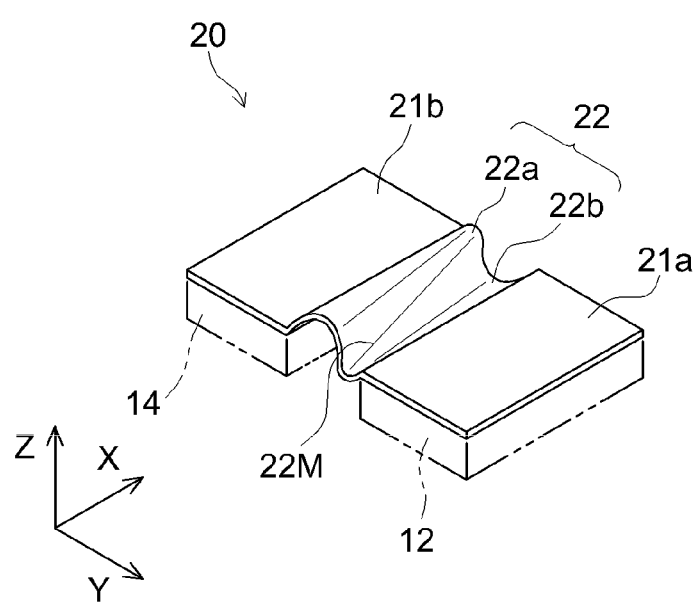
FIG. 2 is a perspective view that schematically shows a bus bar of FIG. 1.
Figure 3:
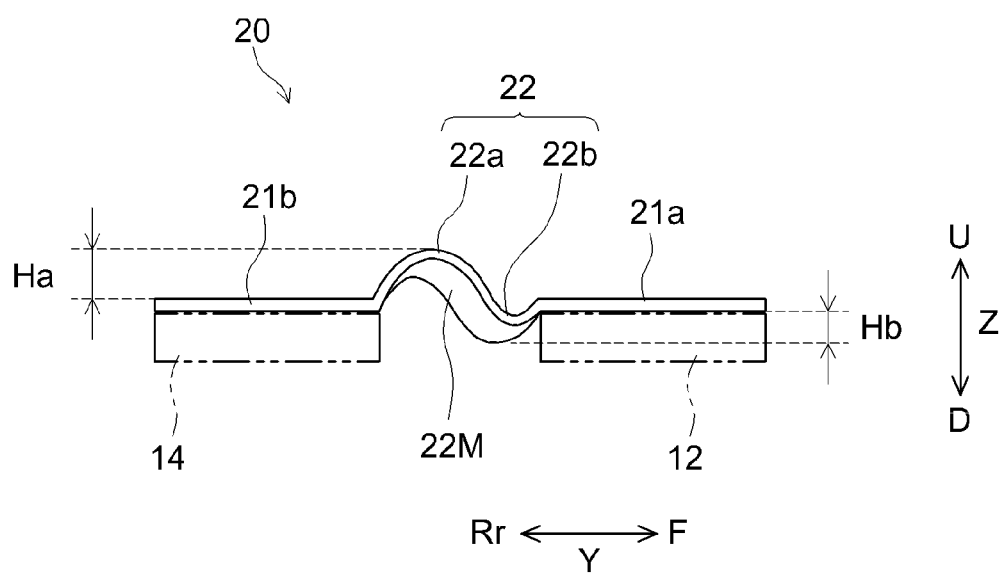
FIG. 3 is a cross-sectional diagram that schematically shows the bus bar of FIG. 1.
Figure 4:
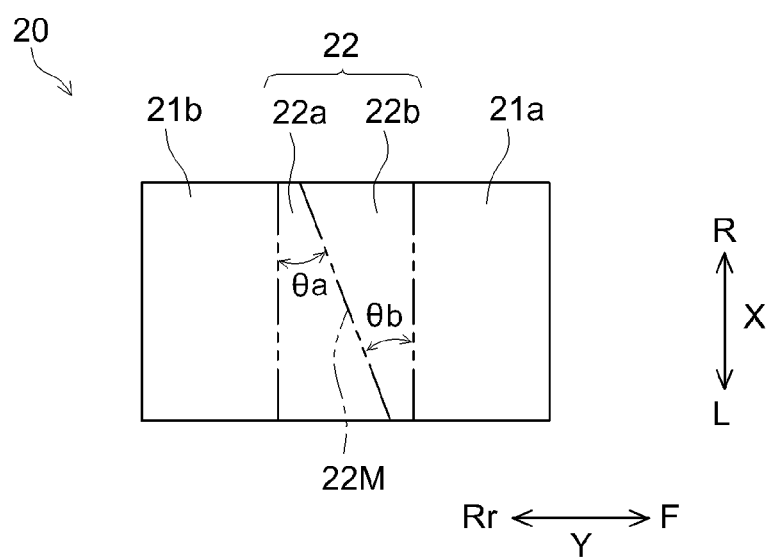
FIG. 4 is a plan view that schematically shows the bus bar of FIG. 1.

FIG. 2 is a perspective view of the bus bar 20. FIG. 3 is a cross-sectional diagram of the bus bar 20 in the height direction Z. FIG. 4 is a plan view of the bus bar 20. As shown in FIGS. 2 to 4, the bus bar 20 has two terminal connecting portions 21a, 21b and a coupling portion 22 interposed between the two terminal connecting portions 21a, 21b. The terminal connecting portions 21a, 21b are disposed at either end in the array direction Y. The coupling portion 22 is disposed in a middle section between the terminal connecting portions 21a, 21b. The coupling portion 22 extends from the terminal connecting portions 21a, 21b. The bus bar 20 in this kind of shape is formed by, for example, bending a piece of metal plate by stamping.

The terminal connecting portions 21a, 21b are connected to the positive electrode terminal 12 and the negative electrode terminal 14 respectively. The terminal connecting portions 21a, 21b each have a flat plate-like shape so as to match the flat surfaces of the positive electrode terminal 12 and the negative electrode terminal 14. In the present embodiment, the terminal connecting portions 21a, 21b are wider in the drawing direction X than in the array direction Y. When viewed planarly, the terminal connecting portions 21a, 21b have the same shape as the positive electrode terminal 12 and the negative electrode terminal 14 of the single cell 10. Areas of the terminal connecting portions 21a, 21b may be the same as or smaller than those of the positive electrode terminal 12 and the negative electrode terminal 14, when viewed planarly. However, the shape and size of the terminal connecting portions 21a, 21b are not particularly limited and therefore can be changed accordingly. For example, in a case where the positive electrode terminal 12 and the negative electrode terminal 14 each have a screw tightening portion which is in the shape of a bolt, the terminal connecting portions 21a, 21b may each be provided with a through-hole that has an outer diameter capable of allowing the insertion of the screw tightening portion in the height direction Z.

The coupling portion 22 electrically connects the two terminal connecting portions 21a, 21b. In the present embodiment, the coupling portion 22 is wider in the drawing direction X than in the array direction Y. Although not particularly limited thereto, a width of the coupling portion 22 in the drawing direction X may be approximately 10 mm or longer such as 20 mm or longer, and approximately 100 mm or shorter such as 50 mm or shorter. The width of the coupling portion 22 in the array direction Y is not particularly limited either and may be approximately 10 mm or longer such as 20 mm or longer, and approximately 100 mm or shorter such as 50 mm or shorter. These ranges can efficiently reduce stress applied in a torsional direction.

The coupling portion 22 is divided into two sections in the array direction Y by an inflection line 22M. The inflection line 22M is a set of points located at the same positions as the terminal connecting portions 21a, 21b in the height direction Z. The coupling portion 22 has one projection 22a and one recess 22b. The projection 22a is bent upward in the height direction Z, along the wide surface of the single cell 10. The projection 22a is bent away from the single cell 10. The recess 22b is bent in a direction opposite to the direction in which the projection 22a is bent, i.e., downward in the height direction Z. The recess 22b is bent toward the single cell 10. The projection 22a and the recess 22b are disposed side by side in the array direction Y. The projection 22a and the recess 22b extend in such a manner as to intersect with the array direction Y. In the present embodiment, the projection 22a and the recess 22b extend along the drawing direction X. The projection 22a and the recess 22b extend from one end of the bus bar 20 in the drawing direction X to the other. It should be noted that the projection 22a is an example of the first bent portion and the recess 22b is an example of the second bent portion.

The number of projections 22a and the number of recesses 22b may each be one as in the present embodiment or two or more projections 22a and/or recesses 22b may be provided. The number of projections 22a may be the same as or different from the number of recesses 22b. The number of projections 22a is, for example, (the number of recesses 22b±1). In a case where a plurality of projections 22a and/or recesses 22b are provided, it is preferred that one or more projections 22a and one or more recesses 22b be disposed alternately in the array direction Y.

When sectionally viewed, the projection 22a and the recess 22b each have a curved surface shape that can be obtained by obliquely cutting an oblique cone. In the height direction Z, a maximum bending height Ha of the projection 22a and a maximum bending height Hb of the recess 22b may be the same or different. Although not particularly limited thereto, each of the maximum bending heights Ha, Hb is typically 1 to 10 mm or may be preferably 1.5 mm or longer such as approximately 2 to 5 mm, in terms of efficiently reducing stress applied in the torsional direction. Each of the maximum bending heights Ha, Hb may be shorter than, for example, the length (thickness) of the positive electrode terminal 12 and the negative electrode terminal 14 in the height direction Z.

The projection 22a is configured to expand gradually from the right end toward the left end in the drawing direction X (the direction in which the projection 22a extends). In other words, the projection 22a is configured in such a manner that a width thereof in the array direction Y increases gradually from the right end toward the left end in the drawing direction X. The recess 22b is configured to narrow gradually from the right end toward the left end in the drawing direction X (the direction in which the recess 22b extends). In other words, contrary to the projection 22a, the recess 22b is configured in such a manner that a width thereof in the array direction Y narrows gradually from the right end toward the left end in the drawing direction X. Note that the term "gradually" mentioned in the present specification typically indicates a linear change; however, the term can allow a change rate to slightly fluctuate in the middle due to, for example, a manufacturing process and the like.

An inclination angle θa of the projection 22a (i.e., an angle between the inflection line 22M and a border line between the terminal connecting portion 21b and the coupling portion 22) may be the same as or different from an inclination angle θb of the recess 22b (i.e., an angle between the inflection line 22M and a border line between the terminal connecting portion 21a and the coupling portion 22). Although not particularly limited thereto, each of the inclination angles θa, θb is typically 3° to 60° or may be, for example, approximately 5° to 45° in terms of efficiently reducing stress applied in the torsional direction.

The projection 22a and the recess 22b are point-symmetric with respect to a center of an XY plane facing the single cell 10 as a symmetry center point (reference). The coupling portion 22 is point-symmetric with respect to a center of the inflection line 22M in the drawing direction X as the symmetry center point (reference). The bus bar 20 is point-symmetric with respect to the center of the XY plane. Accordingly, stress applied in the first torsional direction and stress applied in the second torsional direction opposite to the first torsional direction can be reduced in a balanced manner (evenly). However, for example, depending on the installation mode or the like of the battery pack 1, in some cases the battery pack 1 is displaced easily in either the first torsional direction or the second torsional direction. In such a case, the coupling portion 22 or the bus bar 20 does not have to be line-symmetric or point-symmetric.

In the battery pack 1 of the present embodiment, as described above, the bus bar 20 has the projection 22a and the recess 22b. Therefore, in a case where stress in the torsional direction is applied to the battery pack 1, the battery pack 1 becomes distorted, with a right-side end of the projection 22a or a left-side end of the recess 22b as the support, thereby favorably dispersing the stress. As a result, the concentration of the stress on the connections between the positive and negative electrode terminals 12 and 14 and the bus bar 20 can be reduced. Because the bus bar 20 has the projection 22a and the recess 22b which are of opposite shapes, the battery pack 1 can favorably react to a displacement in the first torsional direction and a displacement in the second torsional direction which is opposite to the first torsional direction. As a result, electrical disconnection between the positive and negative electrode terminals 12 and 14 and the bus bar 20 can be prevented, improving the durability and reliability of the battery pack 1.

The inventors of the present invention actually executed a simulation using commercially available stress analysis software under the following conditions. As a result of the simulation, the inventors have found that the battery pack 1 of the present embodiment that uses the bus bar 20 having the projection 22a and the recess 22b was more effective in reducing the stress concentrated on the connections between the positive and negative electrode terminals 12 and 14 and the bus bar 20, than battery pack of the prior art that use a flat plate-shaped bus bar which has neither the projection 22a nor the recess 22b.

Stress Analysis Conditions

Stress analysis software: Abaqus/CAE (manufactured by Dassault Systems K. K.)

Analysis condition: With one of the terminal connecting portions of the bus bar as a support, the battery pack was displaced by 2 mm, and stress applied to the other terminal connecting portion was analyzed.

Input parameters:

TABLE 1

| Setting Conditions | Prior Art | Present Embodiment |
|---|---|---|
| Thickness t of bus bar | 1.0 mm | 1.0 mm |
| Material of bus bar | Aluminum | Aluminum |
| Shape of bus bar | Flat plate | Bus bar 20 (see FIGS. 2 to 4) |
| Inclination angles θa, θb of projection 22a and recess 22b (see FIG. 4) | — (none) | 10° |
| Bending heights Ha, Hb of projection 22a and recess 22b (see FIG. 3) | — (none) | 1.5 mm |

Results of Stress Analysis

TABLE 2

| | Prior art | Present embodiment |
|---|---|---|
| Drawing direction X | 77 MPa | 63 MPa |
| Array direction Y | 75 MPa | 31 MPa |
| Height direction Z | 46 MPa | 43 MPa |

The battery pack 1 can be used for various purposes. Due to the high durability of the battery pack 1 to stress from torsional directions, the battery pack 1 can favorably be used as, for example, a power source for a motor equipped in a moving object such as a vehicle (a driving power source). The type of the vehicle is not particularly limited, and examples thereof typically include motor vehicles such as plug-in hybrid vehicles (PHV), hybrid vehicles (HV), electric vehicles (EV), electric trucks, electric scooters, electric assisted bicycles, electric wheelchairs, and electric railroads.

The present invention was described above in detail. However, the foregoing embodiment and examples are merely for the purpose of illustration, and the invention disclosed herein includes examples that can be obtained by modifying and changing the foregoing specific examples in various ways.

Figure 5:
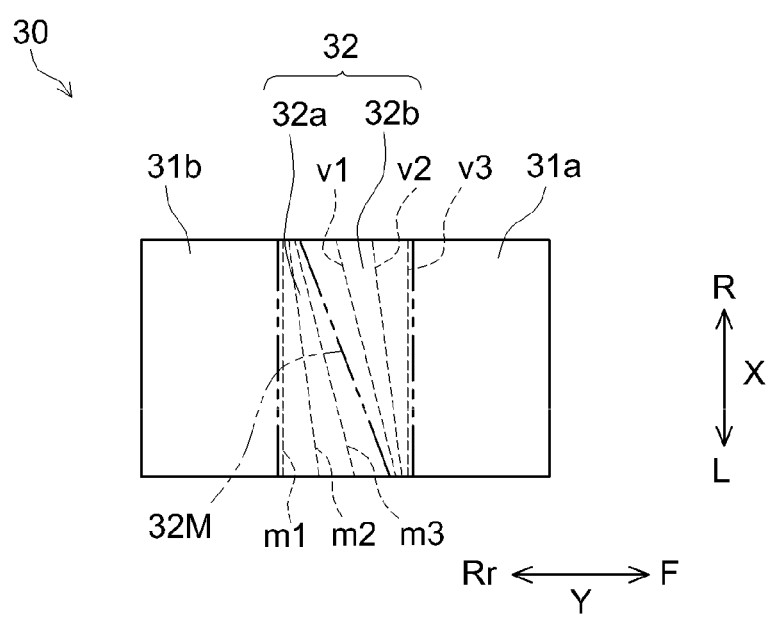
FIG. 5 is a plan view that schematically shows a bus bar according to another embodiment.

For example, according to the embodiment, the bus bar 20 is formed by bending a piece of metal plate by stamping, and the projection 22a and the recess 22b each have a curved surface shape when sectionally viewed. However, the configuration of the bus bar 20 is not limited thereto. FIG. 5 is a plan view of a bus bar 30 according to another embodiment. The bus bar 30 has two terminal connecting portions 31a, 31b and a coupling portion 32 interposed between the two terminal connecting portions 31a, 31b. The bus bar 30 is the same as the bus bar 20 except for the following features. For example, the two terminal connecting portions 31a, 31b are the same as the terminal connecting portions 21a, 21b.

The coupling portion 32 is divided into two sections in the array direction Y by an inflection line 32M. The coupling portion 32 has one projection 32a and one recess 32b. The bus bar 30 is formed by bending a piece of metal plate. Specifically, the projection 32a is created by forming three mountain folding lines m1 to m3 into a raised pattern. Also, the recess 32b is created by forming three valley folding lines v1 to v3 into a concave pattern. The projection 32a and the recess 32b each have an obliquely cut pyramid shape obtained by obliquely cutting an oblique pyramid. The projection 32a and the recess 32b are point-symmetric with respect to a center of the XY plane as the symmetry center point (reference). The bus bar 30 is point-symmetric with respect to the center of the XY plane. Such bus bar 30 can favorably be used as with the bus bar 20.

Figure 6:
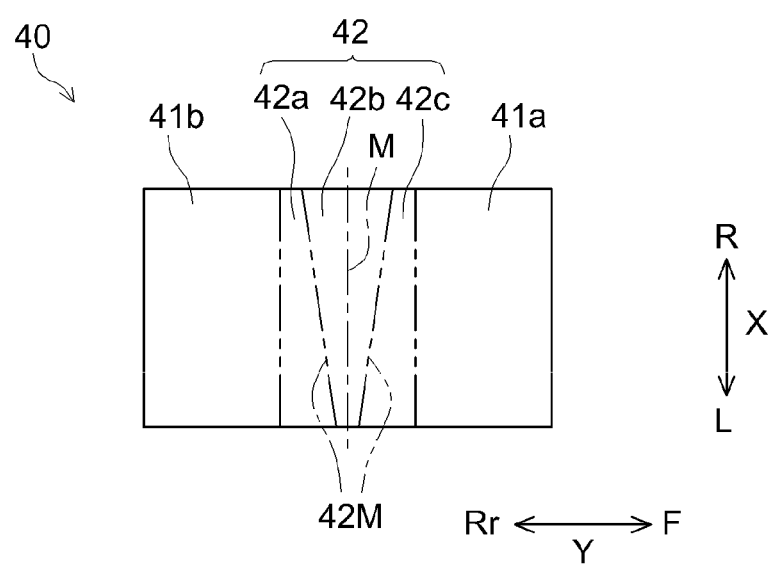
FIG. 6 is a plan view that schematically shows a bus bar of another embodiment.

For example, according to the embodiment, the coupling portion 22 of the bus bar 20 has one projection 22a and one recess 22b. However, the configuration of the coupling portion 22 is not limited thereto. FIG. 6 is a plan view of a bus bar 40 according to another embodiment. The bus bar 40 has two terminal connecting portions 41a, 41b and a coupling portion 42 interposed between the two terminal connecting portions 41a, 41b. The bus bar 40 is the same as the bus bar 20 except for the following features. For example, the two terminal connecting portions 41a, 41b are the same as the terminal connecting portions 21a, 21b.

The coupling portion 42 is divided into three sections in the array direction Y by two inflection lines 42M. The coupling portion 42 has two projections 42a, 42c and one recess 42b. The two projections 42a, 42c and the recess 42b are disposed alternately along the array direction Y. In other words, in the array direction Y, the two projections 42a, 42c are disposed adjacent to the two terminal connecting portions 41a, 41b respectively, and the recess 42b is disposed between the two projections 42a, 42c.

When sectionally viewed, the two projections 42a, 42c each have a curved surface shape that can be obtained by obliquely cutting an oblique cone. The recess 42b has a curved surface shape (tapered shape) that can be obtained by obliquely cutting a right circular cone. The maximum bending height of the two projections 42a, 42c is smaller than that of the recess 42b. The coupling portion 42 is line-symmetric with respect to a centerline M of the XY plane in the array direction Y as the symmetry center point (reference). The two projections 42a, 42c and the recess 42b are line-symmetric with respect to the centerline M of the XY plane in the array direction Y. The bus bar 40 is line-symmetric with respect to the centerline M of the XY plane in the array direction Y. Such bus bar 40 can favorably be used as with the bus bar 20.

For example, according to the embodiment, the coupling portion 22 of the bus bar 20 is configured by the projection 22a and the recess 22b. However, the configuration of the coupling portion 22 is not limited thereto. For example, the coupling portion 22 may have a flat portion or another bent portion in addition to the projection 22a and the recess 22b. For example, a U-shaped bent portion such as the one described in Japanese Patent Application Laid-open No. 2013-19133, the width of which in the array direction Y is even from the right end through the left end in the drawing direction X, may be provided at the border between the terminal connecting portions 21a, 21b.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery pack, comprising:
   a plurality of single cells arranged in an array direction; and
   a bus bar that electrically connects the plurality of single cells, wherein
   the bus bar has a first bent portion that is bent in a direction away from each of the single cells, and a second bent portion that is bent in a direction opposite to the direction in which the first bent portion is bent,
   the first bent portion and the second bent portion are disposed side by side in the array direction, extending from one end of the bus bar to the other end of the bus bar so as to intersect with the array direction,
   the first bent portion is configured such that a width of the first bent portion at the other end is wider than a width of the first bent portion at the one end along an extending direction of the first bent portion, and
   the second bent portion is configured such that a width of the second bent portion at the other end is narrower than a width of the second bent portion at the one end along an extending direction of the second bent portion.

2. The battery pack according to claim 1, wherein the first bent portion and the second bent portion are disposed to be at least either point-symmetric with respect to a center of the bus bar or line-symmetric with respect to a centerline of the bus bar in the array direction.

3. The battery pack according to claim 1, wherein
   the single cells each have a power generation element, a battery case for storing the power generation element, and an external terminal attached to the outside of the battery case,
   the bus bar is electrically connected to the external terminal, and
   a welding joint is formed at a position where the external terminal is connected to the bus bar.

* * * * *